United States Patent
Talbot et al.

(10) Patent No.: US 7,097,768 B2
(45) Date of Patent: Aug. 29, 2006

(54) COCONUT MESOCARP-BASED BIOFILTER MATERIAL AND ITS USE IN A WASTEWATER TREATMENT SYSTEM

(75) Inventors: Pierre Talbot, Notre-Dame-du-Portage (CA); Denis Pettigrew, Notre-Dame-du-Portage (CA); Roger Lacasse, Notre-Dame-du-Portage (CA); Ginette Bélanger, Notre-Dame-du-Portage (CA); Yves Arcand, St-Hyacinthe (CA); Jean-Pierre Dautais, Basse Goulaine (FR)

(73) Assignee: Premier Tech 2000 LTEE, (CA)

( * ) Notice: Subject to any disclaimer, the term of this patent is extended or adjusted under 35 U.S.C. 154(b) by 0 days.

(21) Appl. No.: 10/667,638

(22) Filed: Sep. 22, 2003

(65) Prior Publication Data
US 2004/0124139 A1   Jul. 1, 2004

(30) Foreign Application Priority Data
Sep. 20, 2002   (CA) .................................. 2405062

(51) Int. Cl.
*C02F 3/00* (2006.01)
(52) U.S. Cl. ................. 210/617; 210/150; 210/505
(58) Field of Classification Search ................ 210/602, 210/615, 617, 150, 151, 505
See application file for complete search history.

(56) References Cited

U.S. PATENT DOCUMENTS

| | | | |
|---|---|---|---|
| 2,888,095 A | 5/1959 | Perrini et al. | |
| 4,160,727 A | 7/1979 | Harris, Jr. | 210/23 |
| 4,861,475 A | 8/1989 | Peterson | 210/242.4 |
| 5,049,265 A | 9/1991 | Boyd et al. | 210/150 |
| 5,106,648 A | 4/1992 | Williams et al. | 427/3 |
| 5,206,206 A | 4/1993 | Buelna et al. | 502/404 |
| 5,264,129 A | 11/1993 | Simpson et al. | 210/611 |
| 5,274,129 A | 12/1993 | Natale et al. | 549/349 |
| 5,458,662 A * | 10/1995 | Toyone | 47/62 R |
| 5,750,026 A | 5/1998 | Gadkaree et al. | 210/502.1 |
| 5,868,924 A | 2/1999 | Nachtman et al. | 210/85 |
| 6,010,626 A | 1/2000 | D'Agostino | 210/238 |
| 6,027,652 A | 2/2000 | Hondroulis et al. | 210/671 |
| 6,033,559 A | 3/2000 | Bender et al. | 210/150 |
| 6,033,573 A | 3/2000 | Toles et al. | 210/688 |
| 6,107,242 A | 8/2000 | Ackerman et al. | 502/404 |
| 6,165,366 A | 12/2000 | Sarangapani | 210/666 |
| 6,174,433 B1 | 1/2001 | Futami | 210/195.3 |
| 6,189,260 B1 | 2/2001 | Kusey et al. | 47/9 |

(Continued)

FOREIGN PATENT DOCUMENTS

DE        2127726        12/1972

(Continued)

OTHER PUBLICATIONS

Ismail. M.R. et al., Effects of Water Availability on Growth, Water Relations, Physiological Processes and Yield of Tomatoes Grown in Coconut Coir (Cd): Peat Mix Peat in Horticulture/Posters, Botanical Physical and Chemical Properties of Peat Products pp. 176-180.

(Continued)

*Primary Examiner*—Christopher Upton
(74) *Attorney, Agent, or Firm*—St. Onge Steward Johnston & Reens LLC (57) ABSTRACT

A biofilter material for biofiltering a fluid is disclosed. This biofilter material comprises fragments of coconut mesocarp. A wastewater treatment system is also disclosed and comprises a filter bed and a water distribution system. The filter bed comprises fragments of coconut mesocarp as a biofilter material.

17 Claims, 6 Drawing Sheets

U.S. PATENT DOCUMENTS

| | | | |
|---|---|---|---|
| 6,224,768 | B1 | 5/2001 | Navarre et al. .......... 210/502.1 |
| 6,383,386 | B1 | 5/2002 | Hying et al. ........... 210/500.25 |
| 6,391,120 | B1 | 5/2002 | Silva ............................. 134/7 |
| 6,620,321 | B1 | 9/2003 | Festa et al. ................. 210/602 |
| 6,696,284 | B1* | 2/2004 | Haridas et al. ............. 210/150 |
| 6,830,688 | B1* | 12/2004 | Austin et al. ............... 210/602 |
| 2001/0047955 | A1 | 12/2001 | Chinn et al. ................ 210/164 |
| 2001/0053545 | A1* | 12/2001 | Engwer ...................... 435/262 |
| 2002/0008071 | A1 | 1/2002 | Chinn ........................ 210/767 |
| 2002/0030020 | A1 | 3/2002 | Moorehead et al. ........ 210/741 |
| 2002/0060176 | A1 | 5/2002 | Mierau et al. ................ 210/94 |
| 2002/0134728 | A1 | 9/2002 | Festa et al. ................. 210/617 |

FOREIGN PATENT DOCUMENTS

| | | |
|---|---|---|
| DE | 44 15 963 A1 | 9/1995 |
| DE | 44 45 440 C1 | 12/1995 |
| DE | 195 30 760 A1 | 2/1996 |
| EP | 0 348 670 | 5/1989 |
| FR | 2692833 | 6/1992 |
| GB | 302446 | 12/1928 |
| JP | 57 187003 | 5/1981 |
| JP | 61220797 | 3/1985 |
| JP | 11 291272 | 4/1998 |
| WO | WO 02/26352 A1 | 4/2002 |

OTHER PUBLICATIONS

Radjagukguk, B. et al. A Comparative Study of Peats and Other Media For Containerized Fore Tree Seedlings.

Bandyopadhyay, Swati, P.M. et al. Transient Behavior Of A Coconut Shell Pyrolyzer: A Mathematical Analysis, 1996 Ind. Eng. Chem. Res 35, Art. 1711, pp. 3347-3355.

Chweya, J.A. et al. Preliminary Studies on Some Local Materials For Propagation Media, 1978, E. African Agric. For J. 43(4) Art. 1799-pp. 327-333.

Pillai, C.K.S., et al. A Mechanical Study of the Deterioration of Coconut Leaf Thatch Under Natural and Accelerated Environmental Conditions, 1982, Journal of Materials Science 17, Art. 2124, pp. 2861-2868.

Satyanarayana, K.G. et al. Structure Property Studies of Fibers From Various Parts of the Coconut Tree, 1982, Journal of Materials Science, Art. 2123, pp. 2453-2462.

Remison, S.U. et al. Effect of Salinity on nutrient content of the leafs of coconut seedlings; 1988, Plant and Soil 109, C. Kluwer Academic Publishers, pp. 135-138.

Pryce, Suki, Alternatives to Peat, 1991, Professional Horticulture, vol. 5 pp. 101-106.

Jeganathan, M. Nut Water Analyses As A Diagnostic Tool in Coconut Nutrition Studies, Commun. Soil Sci. Plant Anal., 23 (17-20), pp. 2667-2686.

Handreck, Kevin A., Properties of Coir Dust, And Its Use in the Formulation of Soilless Potting Media, 1993, Commun. Soil Sci. Plant Anal., 24 (3&4) pp. 349-363.

Meerow, Alan, W. The Potential of Coir (Coconut Mesocarp Pith) as a Peat Substitute in Container Media, 1993, Foliage Digest, vol. XIV No. 12.

Muniswaran, P.K. Ananda et al., Production Of Cellulases From Coconut Coir Pith In Solid State Fermentation, 1993, J. Chem. Tech. Biotechnol. 60, pp. 147-151.

Meerow, Alan, W. Growth of Two Subtropical Ornamentals Using Coir (Coconut Mesocarp Pith) as a Peat Substitute, 1994, HortScience, (29(12) pp. 1484-1486.

Coconut By-Product Used As Peat Substitute, Sep. 1997, Biocycle World.

Namasivayam, C. et al. Coirpith, An Agricultural Waste By-Product, For The Treatment Of Dyeing Wastewater, 1994, Elsevier Science Limited, pp. 79-81.

Ingelmo, F. et al., Use of MSW Compost, Dried Sewage Sludge And Other Wastes As Partial Substitutes For Peat And Soil, 1998, Bioresource Technology. pp. 123-129.

Konduru, S. et al., Source And Processing Affects Chemical And Physical Properties Of Coir Dust, 1996, HortScience, vol. 31(4), Poster Session (Abstr. 535-546).

Evans, Michael R. et al., Growth Of Bedding Plants In Sphagnum Peat And Coir Dust-Based Substrates, 1996, J. Environ. Hort 14(4) pp. 187-190.

Evans, Michael R. et al., Source Variation In Physical And Chemical Properties Of Coconut Coir Dust, 1996, HortScience 31(6), pp. 965-967.

Kwon, Kisung et al., Fractionation And Characterization Of Proteins From Coconuts (*Cocos nucifera*), 1996, J. Agric. Food Chem 44, pp. 1741-1745.

Merrow, Alan W., Coir Dust, A Viable Alternative To Peat Moss, Jan. 1997, Greenhouse Product News, pp. 17-21.

Satya, Sai P.M. et al., Production of Activated Carbon From Coconut Shell Char In A Fluidized Bed Reactor, 1997, Ind. Eng. Chem, Res. pp. 3625-3630.

Stamps, Robert H. et al. Growth Of Dieffenbachia Maculata "Camille" In Growing Media Containing Sphagnum Peat Or Coconut Coir Dust, 1997, HortScience 32 (5), pp. 844-847.

Susuki, S. et al. Compositional And Strucutral Structural Characteristics Of Residual Biomass From Tropical Plantations, 1998, J. Wood Sci. 44, pp. 40-46.

Mbah, Benjamin N., Changes In Moisture Retention Properties Of Five Waste Materials During Short-Term Mesophilic Composting, 1998, Compost Science & Utilization, vol. 6, No. 4, pp. 67-73.

Zizumbo-Villarrel, Daniel et al., Pattern Of Morphological Variation And Diversity Of *Cocos nucifera* (Arecaceae) In Mexico, 1998, American Journal of Botany 85(6), pp. 855-865.

Martin-Guillon, Ignacio et al., Comments On Production Of Activated Carbon From Coconut Shell Char In A Fluid Bed Reactor, 1999, Ind. Eng. Chem. Res. 38, pp. 1166-1168.

Tam, Man S. et al, Preparation Of Activated Carbons From Macadamia Nut Shell And Coconut Shell By Air Activation, 1999, Ind. Eng. Chem. Res. pp. 4268-4276.

Satya Sci, P.M. et al., Rebuttal To Comments On Production Of Activated Carbon From Coconut Shell Char In A Fluidized Bed Reactor, 1999, Ind. Eng. Chem, pp. 1169-1171.

Eymar, Enrique et al., Continuous Measurement Of Substrate Electrical Conductivity In Container Grown Plants.

Konduru, S. et al., Coconut Husk And Processing Effects On Chemical And Physical Properties Of Coconut Coir Dust, 1999, HortScience 34 (1), pp. 88-90.

Castillo, M. et al., Determination Of Non-Ionic Surfactants And Polar Degradation Products In Influent And Effluent Water Samples And Sludges Of Sewage Treatment Plants By A Generic Solid-Phase Extraction Protocol, 2000, Analyst 125, pp. 1733-1739.

Viswanathan, R. et al., Pressure Density Relationships And Stress Relaxation Characteristics Of Coir Pith, 2001, J. Agric Engng. Res. 78 (2), pp. 217-225.

Huang, Jenn-Wen et al. A Formulated Container Medium Suppressive To Rhizoctonia Damping Off Of Cabbage, 2000, Bot. Bull, Acad. Sin. 41, pp. 49-56.

Batalon, Juanito T. et al., Optimization Of Coir Dust Compaction Using The Response Surface Methodology Approach, 2001, J. Agric. Engng. Res. 78 (2). Art 2063, pp. 167-175.

de Kreij, C. et al., Growth of Pot Plants In Treated Coir Dust As Compared To Peat, 2001, Commun. Soil Sci. Plant Anal. 32 (13 & 14), pp. 2255-2265.

* cited by examiner

COCONUT MESOCARP-BASED BIOFILTER MATERIAL AND ITS USE IN A WASTEWATER TREATMENT SYSTEM

This application claims priority from pending Canadian Patent Application No. 2,405,062 filed on Sep. 20, 2002.

FIELD OF THE INVENTION

The present invention generally relates to biofiltration materials for filtering a fluid. More particularly, it concerns a biofilter material comprising fragments of coconut mesocarp, and to the use of such biofilter material in a (*Cocos spp*, in particular *Cocos nucifera*) wastewater treatment.

BACKGROUND OF THE INVENTION

Use of Coconuts

In order to better understand the background section of this document, reference will be made to FIG. 1 which is a schematic representation of a cross-section of a coconut (1).

The thin and smooth outer layer that surrounds a coconut (1) is called the epicarp (3). This epicarp (3) covers a middle layer called mesocarp (4) consisting of fibers (5) bound-up with reserve parenchymous tissue (6), as best shown in FIG. 2, and herein below called parenchyma. On its side, the mesocarp (4) covers the endocarp (7) also called the stone which covers the endosperm (8) also called the kernel. Finally, in the center of the coconut (1), we find the water (9). According to studies done on this subject, a typical coconut, without the endocarp, the endosperm and water, weighs an average of 227 g and contains 34% parenchyma, 47% fiber and 19% epicarp on a dry weight basis.

It is worth mentioning that several prior art documents also call the epicarp the exocarp, whereas other prior art documents define the exocarp as comprising, in combination, the epicarp and the mesocarp. The exocarp is also referred to as the husk. However, for the sake of the present application, the word epicarp is only used to refer to the thin skin covering the mesocarp (4) and the word husk is used whenever necessary to refer to the combination of mesocarp with the epicarp.

Currently, the coconut industry relies mainly on the use of the oleaginous kernel, the endosperm (8), contained in the endocarp (7). This kernel (8) is often used for dietary needs or in the production of copra oil intended for specific uses.

Additionally, the mesocarp fibers (5) surrounding the kernel (8) are the object of industrial activities in certain Asian industrialized countries. These fibers (5) are used in the making of woven and braided articles, of padding materials, etc. The extraction of the fiber (5), whether it is through dry or wet processes, requires some or all of the following steps: crushing, grinding, carding and sieving. Such processes yield clean fibers of variable lengths and quality, freed from the parenchyma (6). This parenchyma (6) creates a waste consisting mainly of dust that can reach 2 to 3 mm in diameter. Very often, this waste is disposed of, at a loss, through burning.

However, it is already known in the horticulture industry that this form of waste can be used for the production of horticultural substrate. It should be noted that, in countries where there is no fiber production, the husk, which includes the epicarp (3) and the mesocarp (4), with or without the endocarp, is a waste in its entirety that must be disposed of, usually through burning.

Figures 2A, 2B:
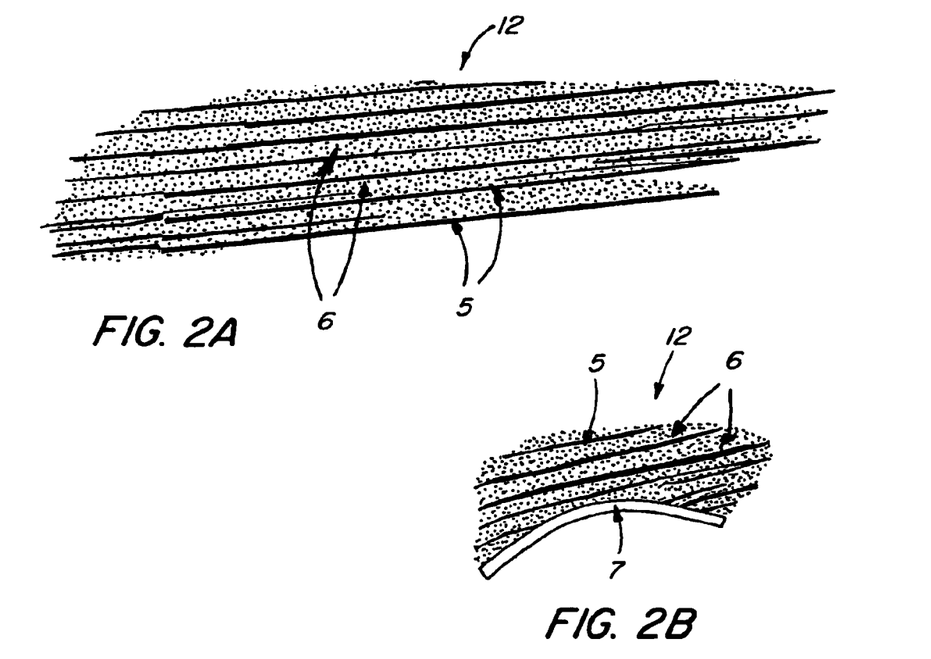
FIG. 2 is a schematic representation of bound-up fibers and parenchyma particles, as used in some of the preferred embodiments of the present invention. This figure shows fragments comprised of mesocarp alone (2A), fragments comprised of mesocarp and endocarp (2B) and fragments comprised of mesocarp and epicarp (2C).

In the last few years, some small industries have been cutting and grinding coconut husks to produce sections of fibers (5) attached to parenchyma (6), thus creating a bound-up mass of a given dimension, (as shown in FIG. 2A). These parenchymous and fiber particles are used in the production of specialized horticultural substrates intended, among other things, for orchid production. The cutting of shell husks is done on a more or less small scale. French patent FR 2,692,833 describes different principles and processes that allow the production of husk fragments made of bound-up fibers and parenchyma. Practical experience has shown that it is difficult to obtain fragments of bound-up fibers and parenchyma of less than 3 mm. The natural resistance of the fibers causes a rupture of the fragments, thus dissociating the fibers and parenchyma, when one attempts to cut or grind them to dimensions that are inferior to 3 mm.

Other examples of the use of coconuts in a variety of applications are given in JP11-291272; JP57-187003; JP61-220797; EP0348670; U.S. Pat. No. 4,160,727; U.S. Pat. No. 5,264,129; U.S. Pat. No. 5,750,026; U.S. Pat. No. 5,868,924; U.S. Pat. No. 6,010,626; U.S. Pat. No. 6,027,652; U.S. Pat. No. 6,033,559; U.S. Pat. No. 6,033,573; U.S. Pat. No. 6,056,876; U.S. Pat. No. 6,107,242; U.S. Pat. No. 6,129,846; U.S. Pat. No. 6,165,366; U.S. Pat. No. 6,174,433; U.S. Pat. No. 6,189,260; U.S. Pat. No. 6,224,768; U.S. Pat. No. 6,383,386; U.S. Pat. No. 6,391,120; US2001/0047955; US2002/0008071; US2002/0030020; US2002/0060176

Wastewater Treatment

The use of biofilters or filters is well known in the field of wastewater treatment. The most widespread way of treating domestic wastewater consists of using a filtration bed of a given height made of porous materials and fed by a water system. The chosen packing material allows the retention of particulate matter and the fixation of micro-organisms that are responsible for the oxidation, among other things, of carbonaceous and nitrogenous matters. To fulfill these functions adequately in a context of commercial industrial production, the ideal packing material must meet different specific characteristics which, up to date, are not found in a single material. The main characteristics that are sought after are summarily presented herein below:

the material should be stable with respect to the erosive action, in the long term, of water percolating through the mass of material and also with respect to biological degradation associated with the action of different microbial populations developing therein;

the same material should be light or of low density and compressible to reduce transportation costs;

also, the compressed material should possess a high intrinsic resilience allowing it to reacquire its initial volume after subsequent bulking. This same characteristic also avoids gullying or compaction of the filtration mass resulting from the energy dissipation linked to the percolation of water through the operating system;

the physical and chemical characteristics of the material should also promote an adhesion of or a colonization by micro-organisms.

these same characteristics should ensure a good hydrophilicity of the material thus permitting a better efficiency when the system is initially fed in water or after its interruption for a more or less long period;

the chosen material should be available in a variety of grain size distributions so as to allow control of the porosimetry of the filtration mass and, from then on, control of its principal hydrodynamical characteristics (in particular, its gas and liquid retention hold-up);

the chosen material should possess an intrinsic porosity that favors capillary or static water retention. On one hand, this type of retention permits a better stability of the system when the flow rate of water to be treated varies over short periods of time or when the operational conditions require several intervals without water supply, which is characteristic of on-site wastewater systems. On the other hand, the availability of capillary water retention maximizes the residence time of contaminants dissolved in the liquid phase when the latter possesses percolating velocities favoring an exchange between capillary and dynamic liquid retention;

the voids in the filtration mass, which are sites for liquid or gaseous dynamic retention, should not possess too high a level of sinuosity and tortuosity in order to maximize oxygen transfer in the gaseous phase. The oxidation capability of the system is directly proportional to this oxygen transfer capability;

the production of the selected material should be performed in the most economical manner possible while minimizing generation of residues or waste;

in the context of sustainable development, the selected material should be natural, renewable and be subjected to a regeneration or recycling following its use as a filtration material.

The different materials currently used to pack biofilters dedicated to wastewater treatment possess some of the characteristics described hereinabove, but none of them adequately meet all of the described requirements. The following summary analysis of these materials highlights their weaknesses and main stumbling blocks.

Sand is the most widely used material for on-site construction of filters for treatment of domestic wastewater when the natural soil is incompatible with a direct disposal of the effluent to be treated. Its weight, high density as well as restricted choice of grain size distribution, greatly limit the use of sand for the large scale development of a commercial industrial product, in particular for transportation reasons. Furthermore, the weak capillary retention of water resulting from the lack of intrinsic porosity affords a material which is sensitive to variations in the hydraulic loading rate.

Variations in the mineral composition of the sand filter are also provided in an attempt to bypass some of the restrictions associated with sand alone. A good example of this is the already known expanded perlite-based filter. The friability of the material annihilates any advantage obtained in terms of lightness and intrinsic porosity. The same comments apply to the zeolith filters distributed by the company Éparco which encounter the problems of excessive material costs.

Peat-based biofilters are also available (Premier Tech patent U.S. Pat. No. 5,206,206; Bord Na Mona patent U.S. Pat. No. 5,049,265) and offer several advantages in comparison with sand-based filters. However, the low resiliency of peat, its reduced stability and its limited hydrophilicity affect the capacity and lifetime of peat-based filtration masses.

A combination of peat with synthetic materials like geotextiles in a vertical configuration allows some of the above-described limitations to be overcome (PCT/CA01/01022). However, any gain involves a significant increase in manufacturing costs and restrictions in terms of the rehabilitation of the filtration mass used. Moreover, the impossibility to compress new material can increase distribution costs of the system depending on the applicable hydraulic load. 100% textile-based biofilters (Reactex™ or Advantex™) or polyurethane foam (Aerocell™) filters encounter the same restrictions in terms of cost and regeneration problems.

Although different types of filters and biofilters are already known, there is still a need for a biofilter made of an optimal packing material which will meet a majority, if not all, of the requirements described hereinabove.

SUMMARY OF THE INVENTION

It is an object of the present invention to provide a biofilter material for biofiltering a fluid which satisfies this need. In accordance with the present invention, that object is achieved with a mesocarp-based biofilter material comprising fragments of coconut mesocarp. The expression coconut mesocarp being intended herein to define a material comprising at least one of the components constituting the mesocarp of a coconut, namely the parenchyma and the fibers.

In accordance with different aspects of the invention, the fragments of mesocarp comprise only fragments of parenchyma, only fragments of fibers, or fragments of both parenchyma and fibers.

More preferably, the mesocarp comprises a mixture of the parenchyma bound-up to the fibers, the parenchyma particles coating the fibers.

The mesocarp fragments of the invention can be used in combination or not with epicarp fragments and/or encocarp fragments.

Mesocarp fragments, with or without epicarp fragments, represent an interesting alternative for the packing of non-saturated systems used in the treatment of contaminated liquids. Indeed, it has been discovered that the use of mesocarp or husk of coconuts as a packing material in filter beds offers surprising results and advantages with respect to known packing materials already used in the field of water treatment. This material indeed meets a majority if not all of the requirements described above as will be further explained below. It has been discovered that coconut mesocarp fragments offer untapped possibilities for the development of percolating filtration beds also within the scope of the invention.

Figure 2C:
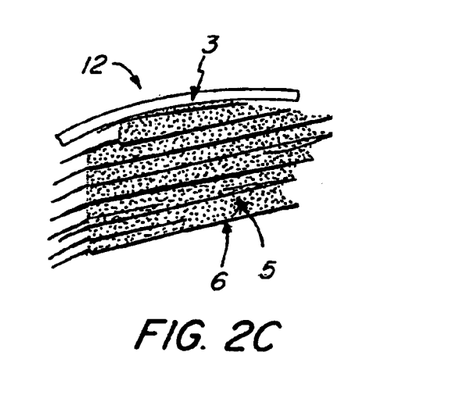

One must note that the biofilter material of the invention may further comprise coconut endocarp and/or epicarp fragments in addition to the mesocarp fragments, as for example the fragments shown in FIGS. 2b and 2c.

The present invention also provides a wastewater treatment system including a filter bed which comprises as a biofilter material, fragments of coconut mesocarp as just described.

More particularly, the invention is directed to the use of bound-up fibers and parenchymous particles as a filtration media for treatment of wastewater. These particles can be used alone, or in combination with other materials. In both cases, the configuration of the filtration media can be isotropic or anisotropic according to the desired properties.

BRIEF DESCRIPTION OF THE DRAWINGS

Other objects and advantages of the invention will become apparent upon reading the detailed description and upon referring to the drawings in which:

FIG. 3 is a schematic representation of biofilters used in water treatment according to two preferred embodiments of the invention. More precisely, FIG. 3 shows isotropic filtration beds comprised of particles of bound-up fibers and parenchyma of small (A) and large (B) diameters.

FIG. 4 is a schematic representation of biofilters used in water treatment according to other preferred embodiments of the invention. More precisely, FIG. 4 shows filtration beds comprised of fragments of bound-up fibers and parenchyma of variable diameter, in either an isotropic (A) or anisotropic (B) configuration.

DESCRIPTION OF PREFERRED EMBODIMENTS

In the following description, similar features in the drawings have been given similar reference numerals and in order to lighten the figures, some elements are not referred to in some figures if they were already identified in a preceding figure.

Definitions

Figure 1:
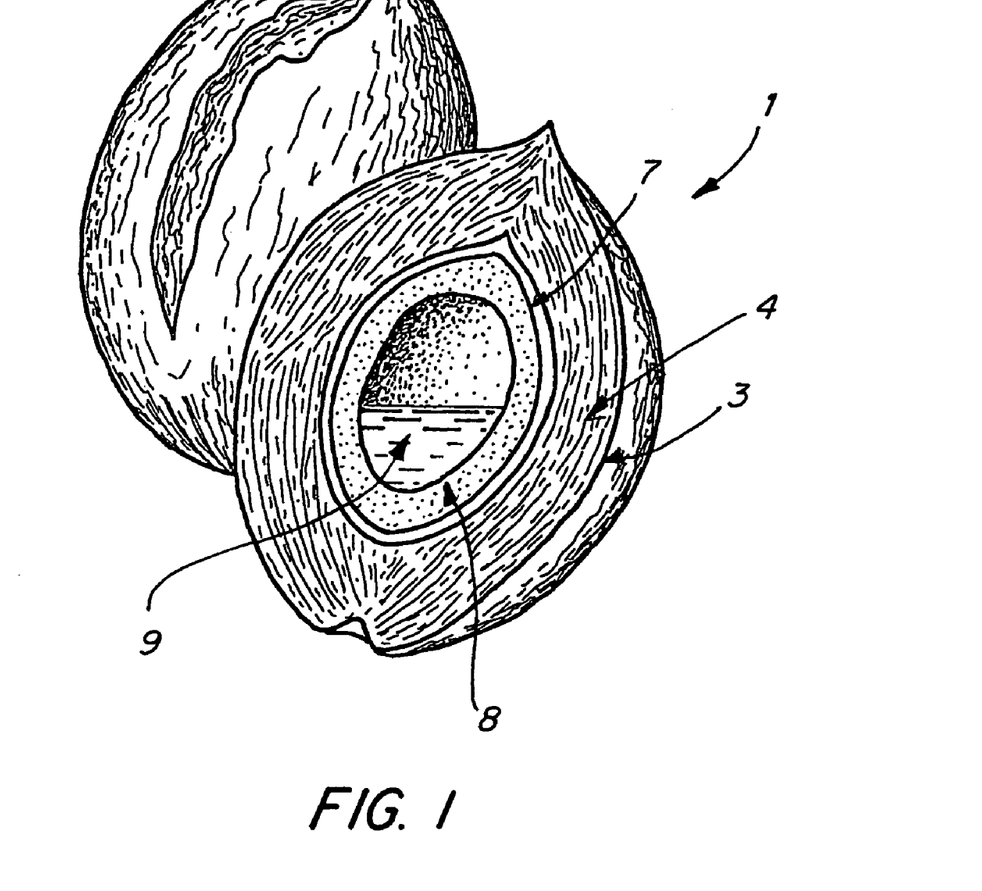
FIG. 1 is a schematic representation of the morphology of a coconut (*Cocos nucifera*).

In order to provide a clearer and more consistent understanding of the specification and the claims, including the scope given herein to such terms, the following definitions are used:

Epicarp (3): the epicarp is the thin and smooth outer layer skin that surrounds a coconut (FIG. 1, element 3);

Endocarp (7): the endocarp (7) is the core or stone of the coconut which contains the endosperm, the endosperm being the white edible portion of a coconut;

Mesocarp (4): the mesocarp (4) is the middle layer between the epicarp (3) and the endocarp (7); it comprises fiber and parenchymous tissue also called parenchyma.

Husk: the husk of a coconut comprising the mesocarp in combination with the epicarp.

Figure 3A:
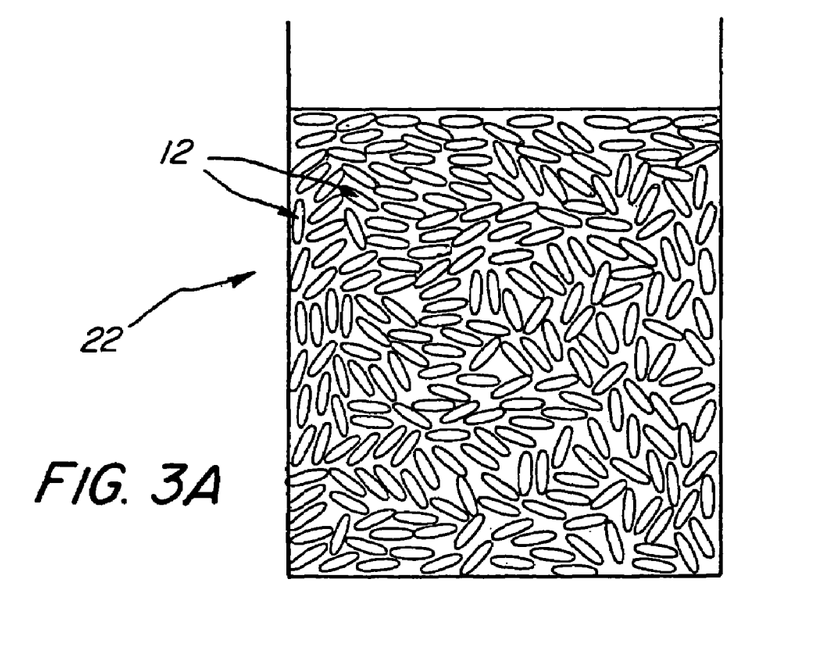
Figure 3B:
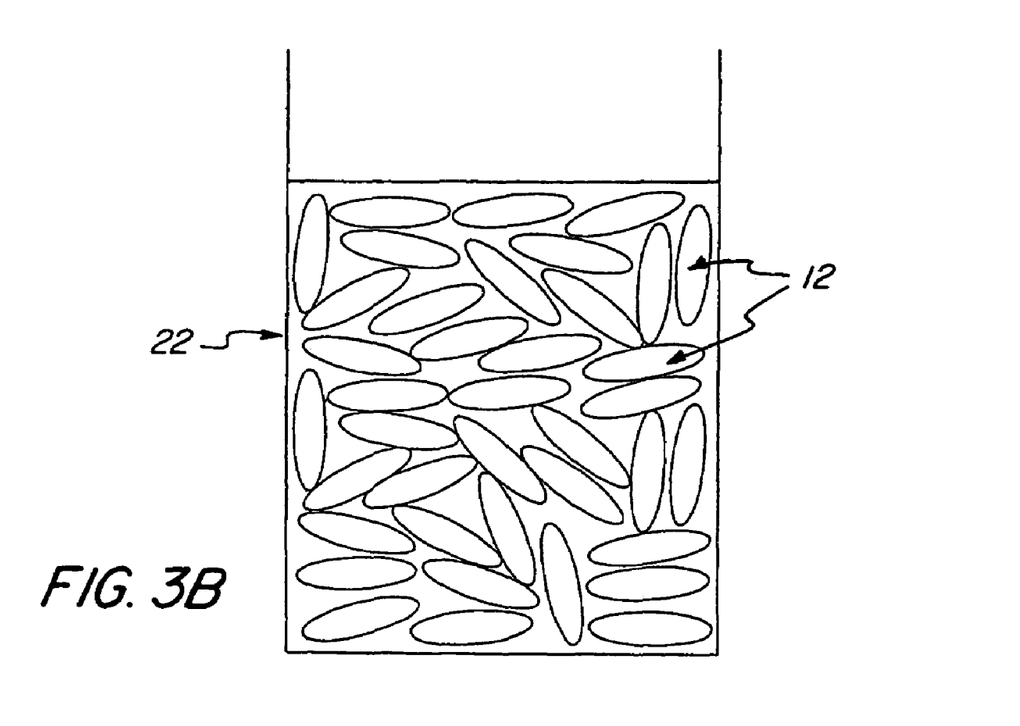
Figure 4A:
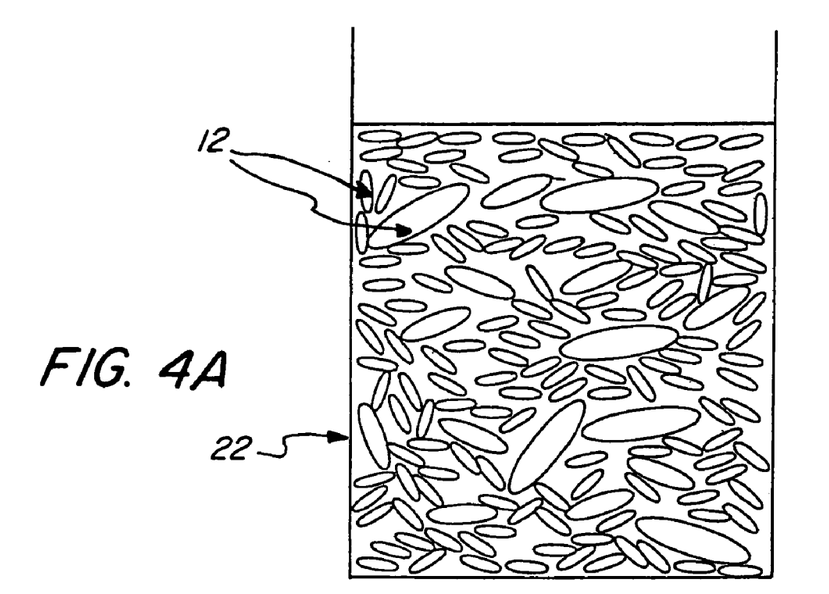
Figure 4B:
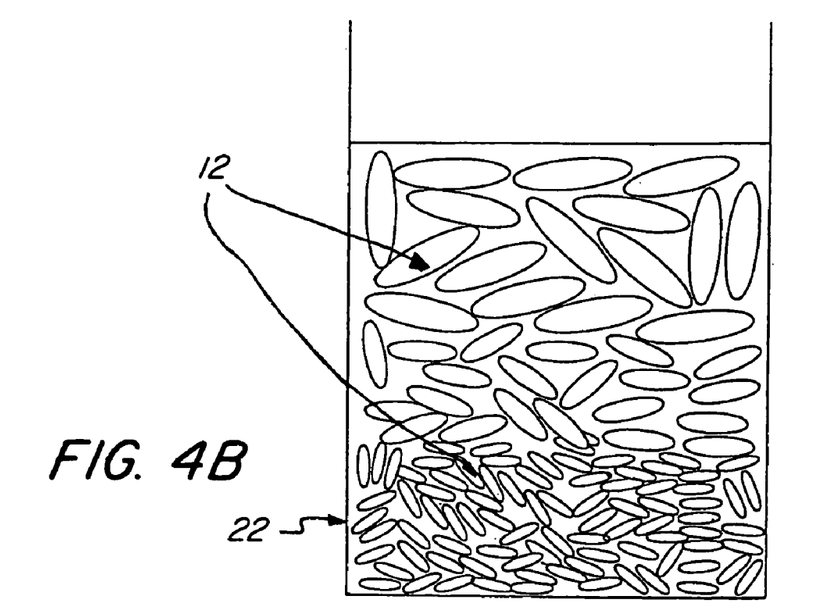

Referring to FIG. 3 or 4, the biofilter material (10) for biofiltering a fluid comprises fragments (12) of coconut mesocarp. Turning now to FIG. 2, such fragments (12) may consist of:

a mixture of parenchyma (6) bound-up to fibers (5) as shown in FIG. 2a, or a mixture of epicarp, parenchyma (6) and fibers (5) as shown in FIG. 2c; or a mixture of endocarp, parenchyma (6) and fibers (5), as shown in FIG. 2b; or parenchyma (6) only (not illustrated), or fibers (5) only, (not illustrated).

More preferably, the fragments (12) of coconut mesocarp comprise a mixture of parenchyma (6) bound-up to fibers (5), as shown in FIG. 2a, with or without epicarp and/or endocarp.

Figure 5:
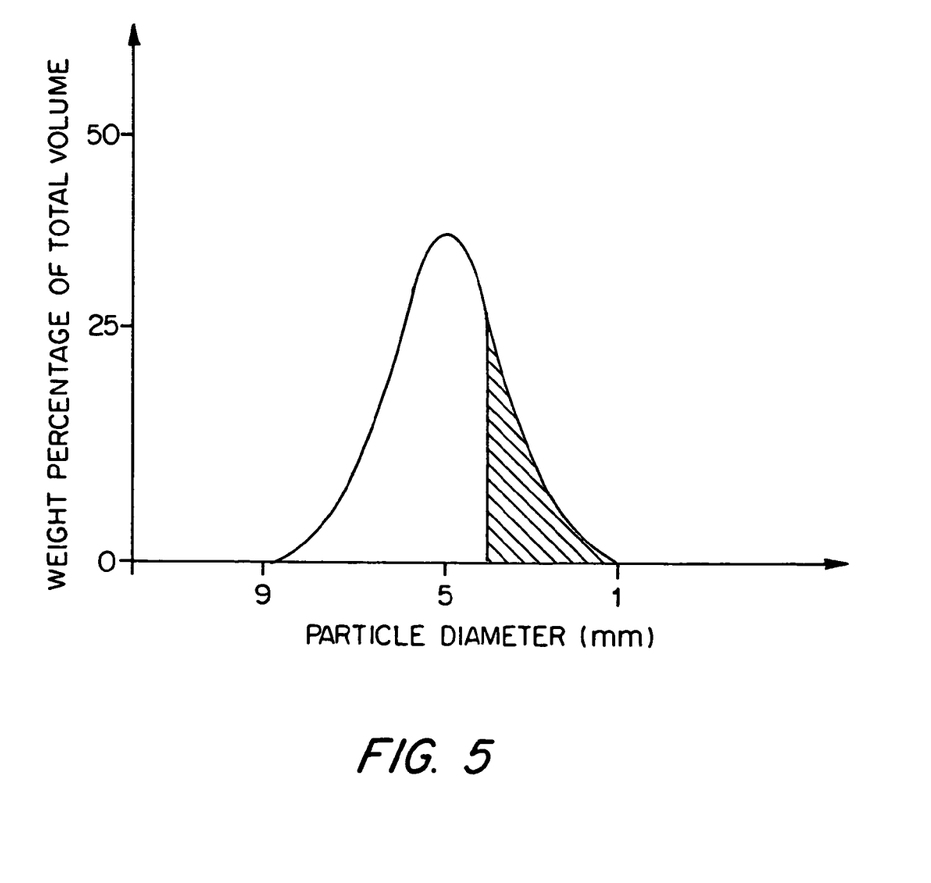
FIG. 5 is an example of a grain size distribution curve for an isotropic filtration bed incorporating particles of bound-up fibers and parenchyma with a diameter greater than 3 mm, as well as isolated parenchyma with a diameter smaller than 3 mm (the latter are shown as hatched).

In accordance with a further preferred aspect, the fragments (12) of parenchyma bound-up to fibers are used in combination with additional filtering materials, such as peat, mineral filtering material, for example, sand, gravel, perlite etc., or synthetic filters materials, for example, geotextile or polymeric material, to gain an even greater control of the properties of the filtration bed. It is possible to obtain an isotropic mixture of fragments of parenchyma bound-up to fibers having a diameter greater than 3 mm, in combination with isolated parenchyma particles with a diameter smaller than 3 mm. Consequently, as shown in FIG. 5, the invention allows a filtration bed having a more spread-out grain size distribution curve which incorporates finer particles. These finer particles play a fundamental role in the removal of pathogenic micro-organisms such as fecal coliformes.

Preferably, the biofilter material comprises from 20% to 80% by weight of fragments of mesocarps. More preferably, it comprises 50%, when in combination with another biofiltering material.

Figure 6:
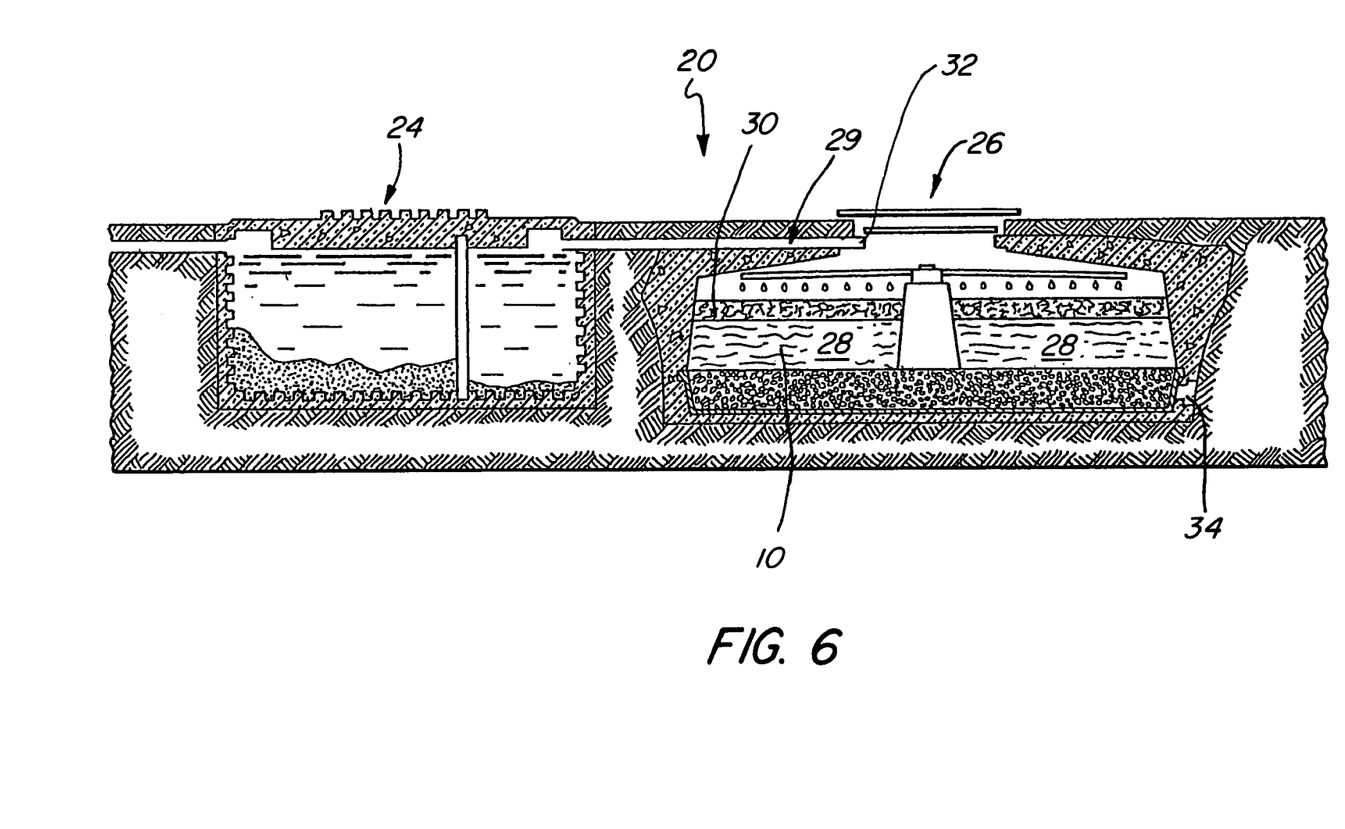
FIG. 6 is a schematic representation of a complete water treatment system for domestic wastewater including a septic tank and a biofilter with a filtration bed according to a preferred embodiment of the invention.

Referring to FIG. 6, the invention also concerns a wastewater treatment system (20) embodying a filter bed (22) comprising the biofilter material (10) and a water system adapted to direct water to the biofilter bed to be treated. In the preferred embodiment of FIG. 6, the wastewater treatment system (20) comprises a conventional septic tank (24), a biofilter unit (26) and a water distribution system (29) between the septic tank (24) and the biofilter unit (26) to direct the water to the biofilter unit (26). The biofilter unit (26) comprises a filter chamber (28) containing the filter bed (22). As can be appreciated, the filter bed (22) may comprise only fragments (12) of mesocarp as described above or it could advantageously comprise an additional biofilter material (30) such as sand, peat, gravel, perlite, geotile or polymeric material. More preferably, and as shown in FIG. 6, the additional biofiltering material is peat which is preferably in the form of a layer of peat (30) topping a layer of the biofilter material (10). Such an anisotropic configuration capitalizes on each material's strong point. Peat, being less costly and less stable, protects the more expensive particles of parenchyma bound-up to fibers, which are more stable and resistant to compaction (FIG. 6).

The filter chamber (28) has an inlet (32) for receiving the water from the distribution system (29) and an outlet (34) for discharging a treated water. The water enters the housing flowing from the inlet (32) to the outlet (34). Preferably, the inlet (32) is located in an upper portion of the chamber (28) above the filter bed, (22) and the outlet (34) is located in a lower portion of the chamber (28) below the filter bed.

Although not illustrated, the filter bed (22) of a wastewater treatment system, in accordance with a further preferred embodiment of the invention, simply consists of a layer of the mesocarp-based biofilter material (10) defined above covering natural soil for treating the water further. The biofilter material according to the invention can thus be used as a substitute to gravel or in combination with gravel in a drainfield.

The use of a layer of particles of parenchyma bound-up to fibers placed on top of a natural soil of lesser permeability than said layer, constitute another application of an anisotropic bed comprising an additional material. Here again, each layer fulfils a specific function: particles of parenchyma bound-up to fibers carry out a roughing treatment, thus protecting the layer of soil responsible for the polishing of the affluent to be treated.

In one aspect of the invention, homogeneously sized fragments of parenchyma bound-up to fibers are confined to form a filtration medium with a narrow grain size distribution curve (low coefficient of uniformity). In a given bed, choice of particle size modulates the level of treatment reached (FIG. 3). For example, larger particles provide a lower treatment level than with finer particles.

However, this latter strategy necessitates more frequent surface maintenance because of the accumulation of particulate matter coming from the affluent to be treated and from the biomass resulting from the growth of microorganisms responsible for biodegradation or pollutant transformation.

In another application of the invention, the use of larger particles opens the door to a system operating in a recirculation mode as opposed to finer particles which are more often limited for use in single percolation operations.

In another embodiment of the invention, the fragments (12) of parenchyma bound-up to fibers used in the filtration bed (22) are of different sizes. These fragments can be placed in different layers of homogenous particle size, for example, from the larger to the finer particle size, to create an anisotropic configuration allowing a specialization of the properties of each level of the filtration bed. These same fragments can also be mixed uniformly to create an isotropic filtration with a specific grain size distribution, as shown in FIG. 4.

Therefore, according to the invention, a wastewater treatment system may embody a filter bed (22) comprising fragments (12) of different grain sizes, and with either an isotropic or an anisotropic grain size distribution.

Tests Results

Examples of the filtering capability of four different filtering media according to the invention are given in Table 1 where TSS represents the total suspended solids in the water effluent discharge and $BOD_5$ represent the biochemical oxygen demand of the water effluent.

TABLE 1

Performance of Biofilters according to their filtering media

| Filtering media | Parenchyma | coconut mesocarp (fibers bound-up parenchyma) | Peat + parenchyma | Peat + coconut mesocarp (fibers bound-up parenchyma) |
|---|---|---|---|---|
| TSS reduction (%) | 98 | 85 | 97 | 96 |
| $BOD_5$ reduction (%) | 98 | 89 | 99 | 98 |

Further Comments and Observations on the Present Invention

The development and studies conducted by the inventors allowed them to set forth the following comments and observations with regards to the invention.

The high lignin content of the fibers and parenchyma, in a lower concentration, ensures a superior stability when compared to the stability obtained with peat or with most other porous biological materials. Moreover, the particles of parenchyma bound-up to fibers are less friable given the high level of cohesion observed in natural coconut shells.

Particles of parenchyma bound-up to fibers possess lower densities than that of peat and are approximately twice as compressible. The coconut can reach a compaction factor of the order of four, as opposed to a maximum of two for peat.

The resiliency and stability of fiber and parenchyma particles, resulting from their high lignin content and from the physical structure of the two components, explains in part the high level of resistance to observable compaction. Indeed, a filtration bed made of peat of a thickness of 80 cm has a level of compaction of 20% after a few months of operation, while a filtration bed made of fiber and parenchyma particles only shows a slight compaction, mostly attributed to a rearrangement of the particles under the influence of water.

The coconut shell residues favor microbial colonization. For example, the coconut fibers can be used to manufacture microbiological beds or matts for the treatment of contaminants in the environment (U.S. Pat. No. 6,033,559).

The residues of coconut exocarp are used as horticultural substrates at humidity levels of the order of 20% while peat-based substrates must have humidity levels greater than 40% and require the use of wetting agents.

Depending on the size of the coconut shell in its natural state and the transformation process used, the particles of coconut fiber and parenchyma offer a great freedom in the choice of grain size distribution. Moreover, the possible range of grain size distribution is increased when combining particles of parenchyma bound-up with fiber with particles of isolated parenchyma.

The parenchymous tissue, owing to its reserve role, presents an alveolar or cavity-type structure which gives it, once dried, a great capability for retaining capillary or static water.

The possible control at the levels particle grain size distribution and morphology minimizes, when needed, the sinuosity and tortuosity of the spaces and voids in the filtration bed, where dynamic liquid and gaseous retention takes place.

The cutting and grinding operations required in the manufacturing of fiber and parenchyma particles are relatively simple. Moreover, one must consider that the raw material represents waste that the manufacturers must spend money on to dispose of properly. Finally, no residue or waste is produced when transforming the shells into particles.

The use of coconut shells in filtration beds is ideal in a context of sustainable development, since it relies on the rehabilitation of an organic waste which can be reused through composting after its utilization for water treatment.

Although preferred embodiments of the present invention have been described in detail herein and illustrated in the accompanying drawings and test results, it is to be understood that the invention is not limited to these precise embodiments and that various changes and modifications may be effected therein without departing from the scope or spirit of the present invention.

What is claimed is:

1. A wastewater treatment system characterized in that it comprises:
   a filter bed comprising a biofilter material comprising a mass of fragments of coconut mesocarp, the mesocarp comprising a mixture of parenchyma bound up to mesocarp fibers; and
   a water system adapted to direct water to the biofilter bed to be treated.

2. The wastewater treatment system of claim 1, characterized in that said filter bed comprises fragments of different grain sizes and has an isotropic size distribution.

3. The wastewater treatment system of claim 1, characterized in that said filter bed comprises fragments of different grain sizes and has an anisotropic size distribution.

4. The wastewater treatment system of claim 1, characterized in that said biofiltering material comprises an additional biofiltering material apart from the fragments of mesocarp.

5. The wastewater treatment system of claim 4, characterized in that said additional biofiltering material is selected from the group consisting of peat, mineral filtering media and synthetic filtering media.

6. The wastewater treatment system of claim 5, characterized in that the filter bed has an isotropic distribution of said biofilter material and said additional biofilter material.

7. The wastewater treatment system of claim 5, characterized in that the filter bed has an anisotropic distribution of said biofilter material and said additional biofilter material.

8. The wastewater treatment system of claim 4, characterized in that said biofiltering material comprises from 20% to 80% of said fragments of mesocarp.

9. The wastewater treatment system of claim 4, characterized in that said biofiltering material comprises 50% of said fragments of mesocarp.

10. The wastewater treatment system of claim 4, characterized in that said other biofiltering material is peat.

11. The wastewater treatment system of claim 10, characterized in that a layer of said peat is topping a layer of said biofilter material.

12. The wastewater treatment system as defined in claim 4, characterized in that said filter bed consists of a layer of said biofilter material covering natural soil for further treating the water.

13. The wastewater treatment system as defined in claim 1, characterized in that said filter bed consists of a layer of said biofilter material covering natural soil for further treating the water.

14. The wastewater treatment system as defined in claim 1, characterized in that it comprises:

a filter chamber containing said filter bed, said chamber having an inlet for receiving the water from the said water system; and an outlet for discharging a treated water; the water entering the housing flowing from the inlet to the outlet.

15. The wastewater treatment system as defined in claim 14, characterized in that the inlet is located in an upper portion of the chamber above the filter bed of biofilter material and the outlet is located in a lower portion of the chamber below the filter bed.

16. Use of a bed of fragments of coconut mesocarp comprising a mixture of parenchyma bound-up to mesocarp fibers for biofiltering water.

17. Use as defined in claim 16, wherein said water is wastewater.

* * * * *